Patented Sept. 28, 1926.

1,601,285

UNITED STATES PATENT OFFICE.

JAMES P. BEATY, OF SILVERDALE, KANSAS.

COMPOSITION OF MATTER FOR USE AS STUCCO.

No Drawing.   Application filed September 28, 1925.   Serial No. 59,147.

This invention relates to a composition of matter for use as stucco for building purposes, one of the objects of the invention being to provide an inexpensive product which will not harden or set while in storage and which, after being properly mixed and applied will neither check nor crack.

With the foregoing and other objects in view the invention consists of the following ingredients substantially in the proportions stated, to wit

| | Parts by bulk. |
|---|---|
| "Pop corn" cinders | 5 |
| Cement | 2 |

To one hundred pounds of the foregoing mixture there should be added 1½ pounds of ground cork.

The cinders known as "pop corn" are a product of smelters and are a black and white material containing no lime. Thus the cinders will not reduce the strength of the cement in the mixture.

The preparation herein described will not set when in storage but will remain perfectly dry. When it is applied in building constructions or the like it will not check nor crack because of the inclusion of the ground cork.

What is claimed is:

A composition of matter for use as a stucco including one and one-half pounds of ground cork mixed with one-hundred pounds of a mixture of cement and cinders in the proportions of two parts of cement with five parts of cinders.

In testimony that I claim the foregoing as my own, I have hereto affixed my signature.

JAMES P. BEATY.